United States Patent
Schwarz et al.

(10) Patent No.: US 11,249,556 B1
(45) Date of Patent: Feb. 15, 2022

(54) SINGLE-HANDED MICROGESTURE INPUTS

(71) Applicant: Microsoft Technology Licensing, LLC, Redmond, WA (US)

(72) Inventors: Julia Schwarz, Redmond, WA (US); Noe Moreno Barragan, Redmond, WA (US); Michael Harley Notter, Woodinville, WA (US); Sheng Kai Tang, Redmond, WA (US); Joshua Kyle Neff, Renton, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/107,848

(22) Filed: Nov. 30, 2020

(51) Int. Cl.
*G09G 5/00* (2006.01)
*G06F 3/01* (2006.01)
*G06T 7/73* (2017.01)
*G06T 7/246* (2017.01)

(52) U.S. Cl.
CPC .............. *G06F 3/017* (2013.01); *G06F 3/013* (2013.01); *G06T 7/246* (2017.01); *G06T 7/73* (2017.01); *G06T 2207/10028* (2013.01); *G06T 2207/30196* (2013.01)

(58) Field of Classification Search
CPC .......... G06F 1/163; G06F 3/011; G06F 3/014; G06F 3/017; G06F 3/0304; G06F 3/04886
See application file for complete search history.

(56) References Cited

U.S. PATENT DOCUMENTS

| | | | |
|---|---|---|---|
| 2012/0062558 A1* | 3/2012 | Lee ................. | G06F 3/04812 345/419 |
| 2013/0113709 A1* | 5/2013 | Wine ................ | G06F 3/0233 345/169 |
| 2014/0055343 A1 | 2/2014 | Kim | |
| 2017/0090747 A1 | 3/2017 | Dash | |

* cited by examiner

*Primary Examiner* — Insa Sadio
(74) *Attorney, Agent, or Firm* — Alleman Hall Creasman & Tuttle LLP

(57) ABSTRACT

A method for single-handed microgesture input comprises receiving hand tracking data for a hand of a user. A set of microgesture targets that include software functions are assigned to positions along a length of a first finger. A visual affordance including indicators for two or more assigned microgesture targets is provided to the user. The received hand tracking data is analyzed by a gesture recognition machine. A location of a thumbtip of the hand of the user is determined relative to the positions along the first finger. Responsive to determining that the thumbtip is within a threshold distance of the first finger at a first position along the length of the first finger, an indicator for a corresponding first microgesture target is augmented, and then further augmented based on a duration the thumbtip is at the first position. Responsive to detecting a confirmation action, the corresponding microgesture target executes.

20 Claims, 11 Drawing Sheets

SINGLE-HANDED MICROGESTURE INPUTS

BACKGROUND

Virtual and augmented reality applications may rely on gesture input provided by a user to evoke specific commands and actions. Depth and visual cameras may enable hand-tracking applications to recognize and stratify various gesture commands. Without being limited by a programmed controller, gesture commands may provide nearly unlimited intuitive inputs.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A method for single-handed microgesture input comprises receiving hand tracking data for a hand of a user. A set of microgesture targets that include software functions are assigned to positions along a length of a first finger. A visual affordance including indicators for two or more assigned microgesture targets is provided to the user. The received hand tracking data is analyzed by a gesture recognition machine. A location of a thumbtip of the hand of the user is determined relative to the positions along the first finger. Responsive to determining that the thumbtip is within a threshold distance of the first finger at a first position along the length of the first finger, an indicator for a corresponding first microgesture target is augmented, and then further augmented based on a duration the thumbtip is at the first position. Responsive to detecting a confirmation action, the corresponding microgesture target executes.

DETAILED DESCRIPTION

Augmented reality (AR) devices allow for users to experience an integrated mixture of virtual imagery and real-world imagery via a wearable display screen. Such devices generally include outward-facing cameras that capture images of the user's real-world environment and allow for the precise overlay of virtual images into the user's field-of-view.

Such outward-facing cameras may also be utilized to capture natural user input (NUI), such as gesture commands. This allows a user to operate the AR device and interact with virtual objects via hand poses and gestures. Often these gestures are unique to the augmented reality system, so that they may be distinguished from traditional hand gestures and poses that are intuitively performed by the user during typical conversations and interactions.

Figure 1:
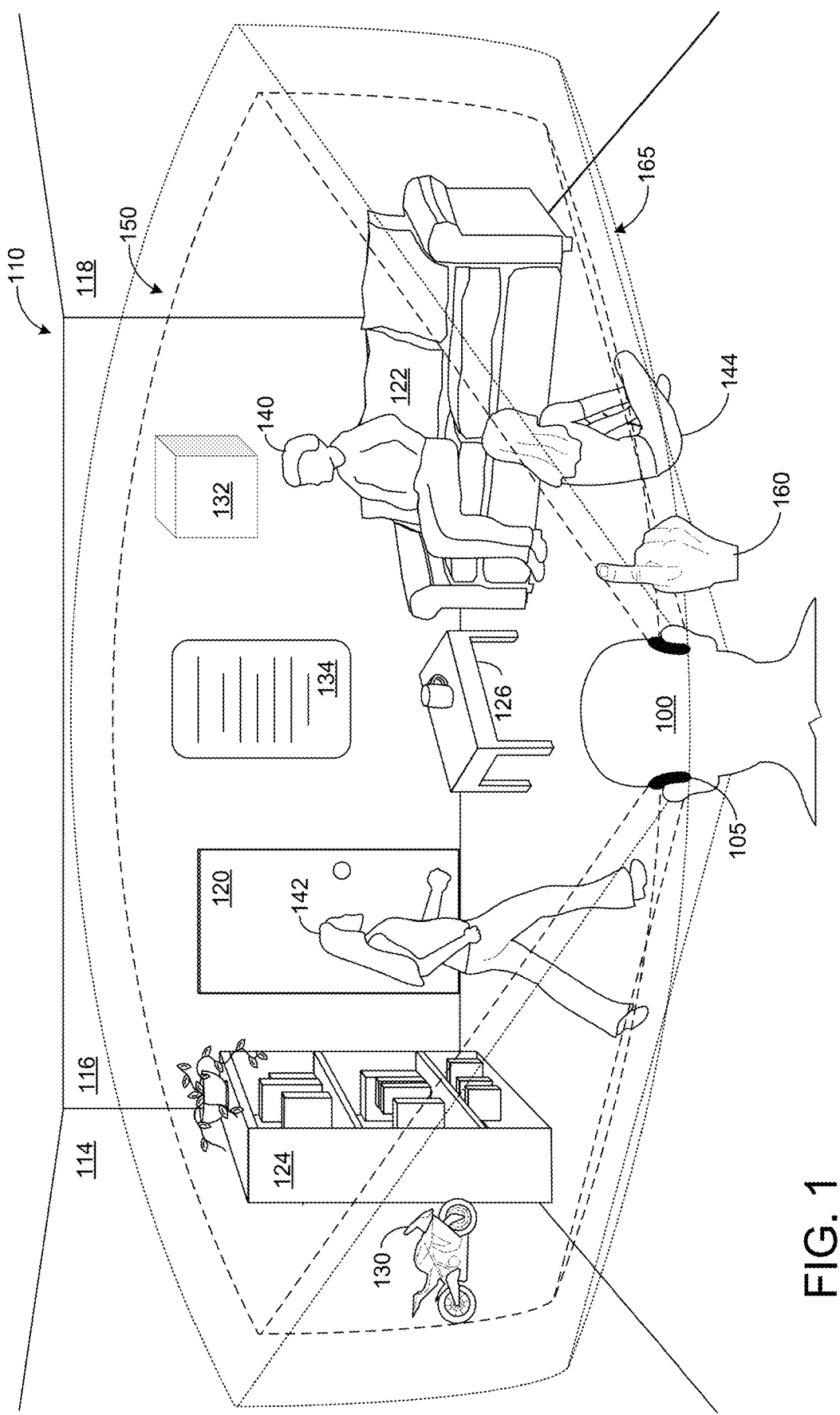
FIG. 1 shows an example augmented reality use environment for a user wearing a head-mounted display.

FIG. 1 is a schematic illustration of a user 100 wearing head-mounted display device 105 and standing in the real-world physical environment of room 110. The room 110 includes a number of physical objects and surfaces, such as walls 114, 116 and 118, door 120, couch 122, bookcase 124, and coffee table 126, all of which are visible to the user via a see-through display of head-mounted display device 105.

Head-mounted display device 105 may display to user 100 virtual content that appears to be located at different three-dimensional locations within room 110. In the example of FIG. 1, head-mounted display device 105 displays virtual content in the form of a holographic motorcycle 130, holographic cube 132, and holographic display monitor 134. Additional individuals 140, 142, and 144 within room 110 are not equipped with their own head-mounted display devices, and thus are unable to view the virtual content.

Head-mounted display device 105 may have a field-of-view, indicated by dashed lines 150, that defines a volume of space in which the user may view virtual content displayed by the device. In different examples of head-mounted display device 105, the field-of-view (FOV) may have different shapes, such as cone-shaped, frustum-shaped, pyramid-shaped, or any other suitable shape. In different examples of head-mounted display device 105, the field-of-view also may have different sizes that occupy different volumes of space.

Sensors included in head-mounted display device 105 may enable natural user interface (NUI) controls, such as gesture inputs based on gestures performed by user's hand 160 when user's hand 160 is within the field-of-view 165 (dotted lines) of the outward facing imaging sensors of head-mounted display device 105.

In this way, user 100 may interact with virtual content without being required to hold a controller or other input device, thus freeing user 100 to interact with real-world and/or virtual world objects with either hand. As shown, the field-of-view of the outward facing imaging sensors (165) may have a larger footprint than the field-of-view of the head-mounted display device (150), and thus some objects may be imaged even if they are not viewable by user 100.

This may enable user 100 to perform gestures out of their own field-of-view and still have the performed gestures be used as NUI controls.

In scenarios where use of the augmented reality device is constrained to a specific venue (e.g., home, manufacturing assistance) performing obvious gesture commands may not present a problem. But in order for AR devices to become widely used in more public locations (e.g, public transit, meetings, sporting events), users may prefer the devices be operable in a socially acceptable manner. As such, more subtle gestures are desired for NUI controls. As shown in FIG. 1, user 100 may appear, to individuals 140, 142, and 144, to be randomly waving their hands around and poking at the invisibility in front of them.

Accordingly, this detailed specification enumerates systems and methods that may be used to implement single-handed microgestures that employ fine-grained gestures and subtle movements on the hand to turn the hand and fingers into multi-functional controllers. Such microgestures enable ultra-discreet controls, that may merely look like generic fidgeting to an outside observer, rather than expressive and public gestures where the whole hand is being evaluated for a pose that can be recognized by others.

In an example, the thumbtip of a hand is evaluated for its relationship to the joints of a finger on the same hand. The relative position (e.g., proximity) and temporal aspects (e.g., dwell time at a position) are evaluated and used to select and activate assigned targets which provide functionality. In some examples, one or more visual affordances are provided to the user to aid in target selection. The system allows for a plurality of targets to be assigned to each finger of the hand, enabling aspects such as scrolling, delving through menu hierarchies, and other functions that may serve to discretely enhance AR operations.

Figure 2:
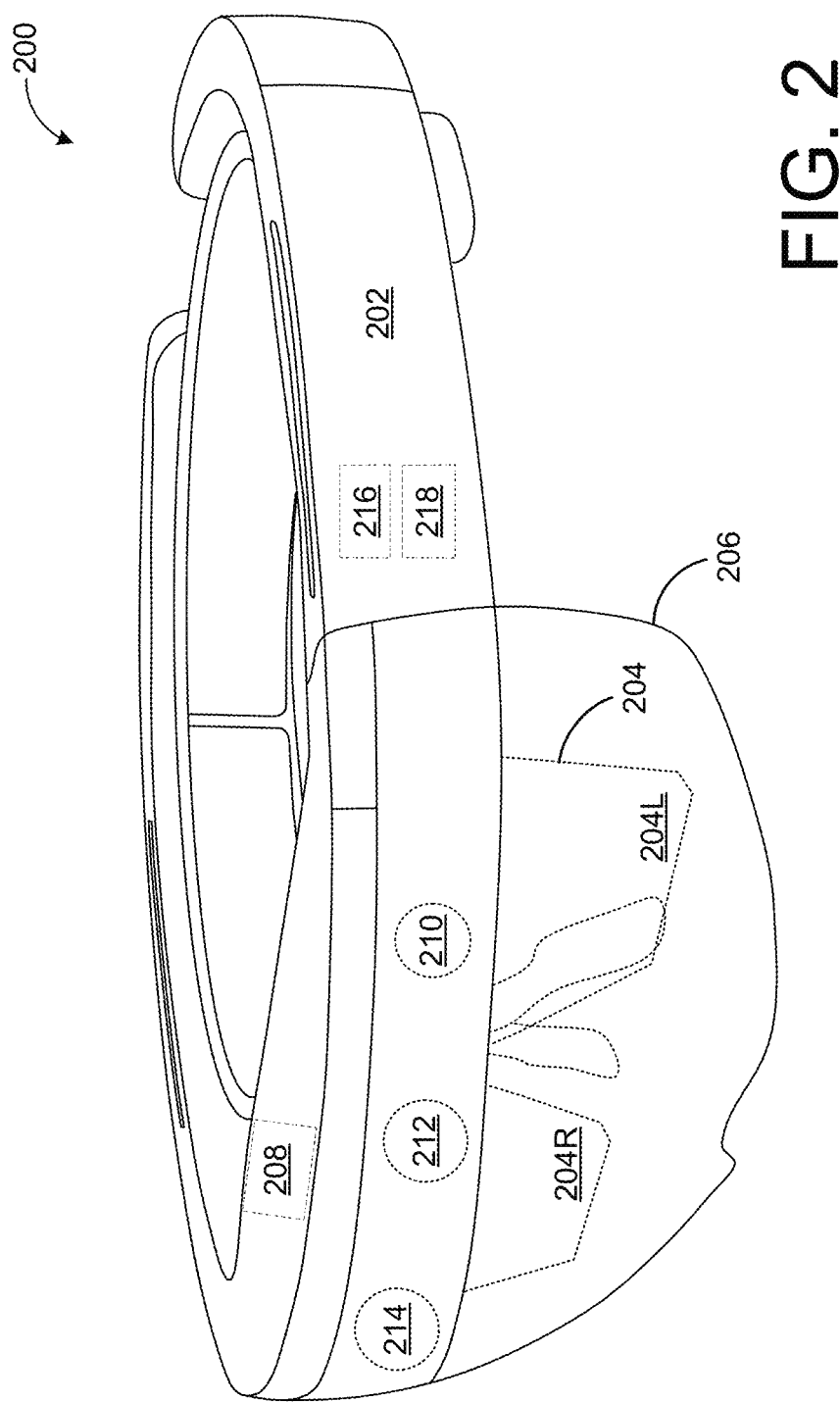
FIG. 2 shows a schematic view of a head-mounted display device according to an example of the present disclosure.

FIG. 2 schematically illustrates an example head-mounted display device 200. The head-mounted display device 200 includes a frame 202 in the form of a band wearable around a head of the user that supports see-through display componentry positioned near the user's eyes. Head-mounted display device 200 may use augmented reality technologies to enable simultaneous viewing of virtual display imagery and a real-world background. As such, the head-mounted display device 200 may generate virtual images via see-through display 204, which includes separate right and left eye displays 204R and 204L, and which may be wholly or partially transparent. The see-through display 204 may take any suitable form, such as a waveguide or prism configured to receive a generated image and direct the image towards a wearer's eye. The see-through display 204 may include a backlight and a microdisplay, such as liquid-crystal display (LCD) or liquid crystal on silicon (LCOS) display, in combination with one or more light-emitting diodes (LEDs), laser diodes, and/or other light sources. In other examples, the see-through display 204 may utilize quantum-dot display technologies, active-matrix organic LED (OLED) technology, and/or any other suitable display technologies. It will be understood that while shown in FIG. 2 as a flat display surface with left and right eye displays, the see-through display 204 may be a single display, may be curved, or may take any other suitable form.

The head-mounted display device 200 further includes an additional see-through optical component 206, shown in FIG. 2 in the form of a see-through veil positioned between the see-through display 204 and the real-world environment as viewed by a wearer. A controller 208 is operatively coupled to the see-through optical component 206 and to other display componentry. The controller 208 includes one or more logic devices and one or more computer memory devices storing instructions executable by the logic device(s) to enact functionalities of the head-mounted display device 200. The head-mounted display device 200 may further include various other components, for example an outward facing two-dimensional image camera 210 (e.g. a visible light camera and/or infrared camera), an outward facing depth imaging device 212, and an inward-facing gaze-tracking camera 214 (e.g. a visible light camera and/or infrared camera), as well as other components that are not shown, including but not limited to speakers, microphones, accelerometers, gyroscopes, magnetometers, temperature sensors, touch sensors, biometric sensors, other image sensors, eye-gaze detection systems, energy-storage components (e.g. battery), a communication facility, a GPS receiver, etc.

Depth imaging device 212 may include an infrared light-based depth camera (also referred to as an infrared light camera) configured to acquire video of a scene including one or more human subjects. The video may include a time-resolved sequence of images of spatial resolution and frame rate suitable for the purposes set forth herein. The depth imaging device and/or a cooperating computing system (e.g., controller 208) may be configured to process the acquired video to identify one or more objects within the operating environment, one or more postures and/or gestures of the user wearing head-mounted display device 200, one or more postures and/or gestures of other users within the operating environment, etc.

The nature and number of cameras may differ in various depth imaging devices consistent with the scope of this disclosure. In general, one or more cameras may be configured to provide video from which a time-resolved sequence of three-dimensional depth maps is obtained via downstream processing. As used herein, the term "depth map" refers to an array of pixels registered to corresponding regions of an imaged scene, with a depth value of each pixel indicating the distance between the camera and the surface imaged by that pixel.

In some implementations, depth imaging device 212 may include right and left stereoscopic cameras. Time-resolved images from both cameras may be registered to each other and combined to yield depth-resolved video.

In some implementations, a "structured light" depth camera may be configured to project a structured infrared illumination having numerous, discrete features (e.g., lines or dots). A camera may be configured to image the structured illumination reflected from the scene. Based on the spacings between adjacent features in the various regions of the imaged scene, a depth map of the scene may be constructed.

In some implementations, a "time-of-flight" (TOF) depth camera may include a light source configured to project a modulated infrared illumination onto a scene. The camera may include an electronic shutter synchronized to the modulated illumination, thereby allowing a pixel-resolved phase-delay between illumination times and capture times to be observed. A time-of-flight of the modulated illumination may be calculated.

The above cameras are provided as examples, and any sensor capable of detecting hand gestures may be used.

Head-mounted display device 200 further includes a gesture-recognition machine 216, and an eye-tracking machine 218. Gesture-recognition machine 216 is configured to process at least the depth video (i.e., a time-resolved sequence of depth maps and/or raw sensor data) from depth imaging device 212 and/or image data from outward facing two-dimensional image camera 210, to identify one or more human subjects in the depth video, to compute various geometric (e.g., skeletal) features of the subjects identified, and to gather from the geometric features various postural or gestural information to be used as NUI.

In one non-limiting embodiment, gesture-recognition machine 216 identifies at least a portion of one or more human subjects in the depth video. Through appropriate depth-image processing, a given locus of a depth map may be recognized as belonging to a human subject. In a more particular embodiment, pixels that belong to a human subject may be identified (e.g., by sectioning off a portion of a depth map that exhibits above-threshold motion over a suitable time scale) and a generalized geometric model of a human being may be derived from those pixels.

In one embodiment, each pixel of a depth map may be assigned a person index that identifies the pixel as belonging to a particular human subject or non-human element. As an example, pixels corresponding to a first human subject can be assigned a person index equal to one, pixels corresponding to a second human subject can be assigned a person index equal to two, and pixels that do not correspond to a human subject can be assigned a person index equal to zero. Further indices may be used to label pixels corresponding to different body parts. For example, pixels imaging a left hand may be labeled with a different index than pixels imaging a right hand; or pixels imaging a pointer finger may be labeled with a different index that pixels imaging a thumb.

Gesture-recognition machine 216 also may label pixels in any suitable manner. As one example, an artificial neural network may be trained to classify each pixel with appropriate indices/labels. In this way, different features of a hand or other body part may be computationally identified.

Gesture recognition machine 216 may track different body parts from frame to frame, thereby allowing different gestures to be discerned. For example, the three-dimensional position of fingers may be tracked from frame to frame, thus allowing parameters such as finger position, finger angle, finger velocity, finger acceleration, finger-to-finger proximity, etc. to be discerned.

The position of the user's eye(s) may be determined by eye-tracking machine 218 and/or gesture recognition machine 216. Eye-tracking machine 218 may receive image data from inward-facing gaze-tracking camera 214. In some examples, inward-facing gaze-tracking camera 214 includes two or more cameras, including at least one camera trained on the right eye of the user and at least one camera trained on the left eye of the user. As an example, eye-tracking machine 218 may determine the position of the user's eye based on the center point of the user's eye, the center point of the user's pupil, and/or gesture recognition machine 216 may estimate the location of the eye based on the location of the head-joint of the virtual skeleton.

Figure 3:
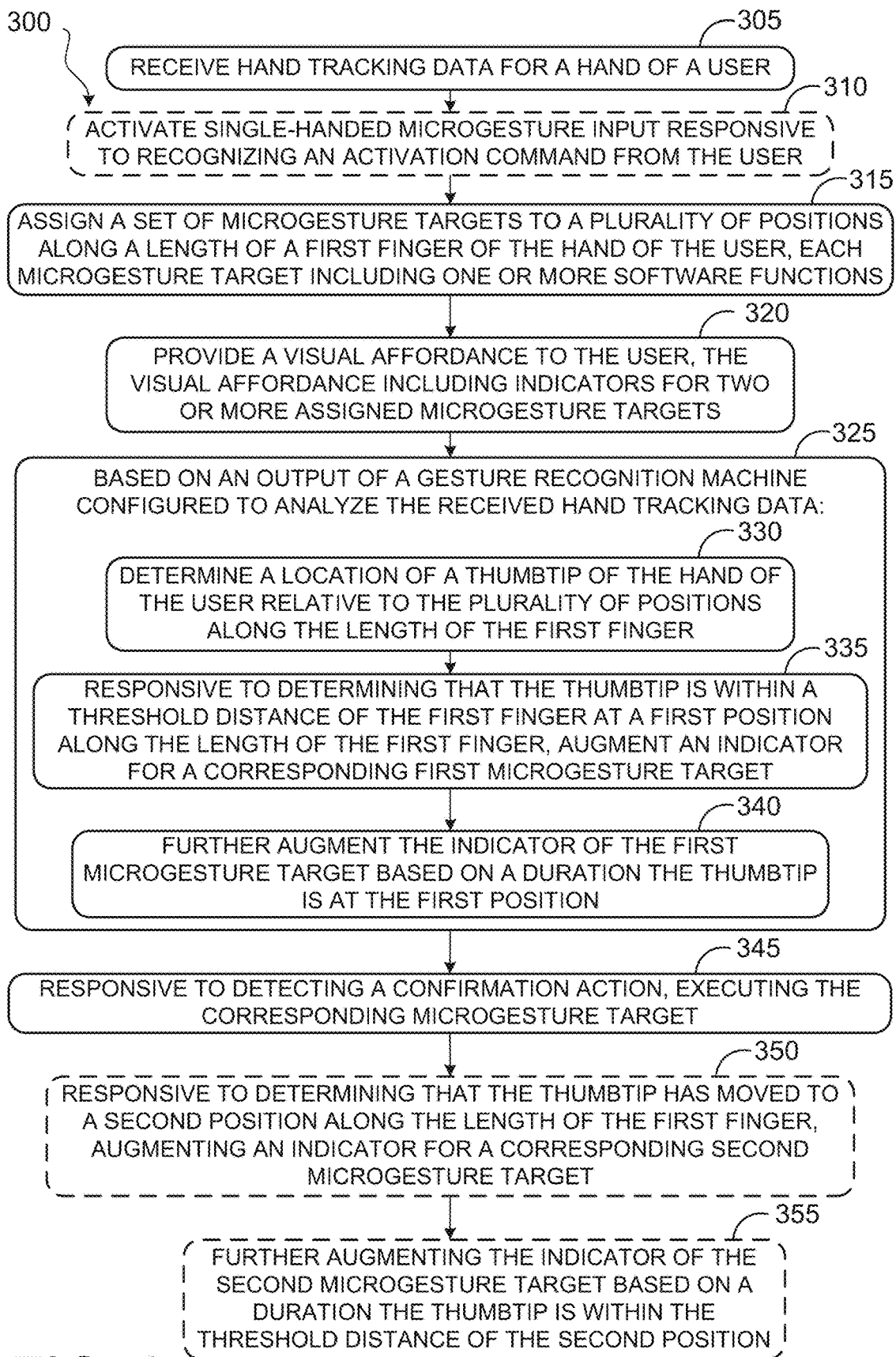
FIG. 3 shows an example method for single-handed microgesture input.

FIG. 3 shows an example method 300 for single-handed microgesture input. Method 300 may be executed by a computing device, such as a head-mounted display device (e.g., head-mounted display devices 105 and 200 and/or computing system 1100 described herein with regard to FIG. 11). Method 300 will primarily be described with regard to augmented reality applications, but may also be applied to virtual reality applications, mixed reality applications, non-immersive applications, and any other systems, environments, and applications having a natural user interface configured to track hand motion and/or otherwise receive gesture input.

At 305, method 300 includes receiving hand tracking data for a hand of a user. Hand tracking data may be derived from received depth information, received RGB image data, received flat IR image data, etc. Data may be received in the form of a plurality of different, sequential frames. The received hand tracking data may include a feature position for each of a plurality of different hand features at each of a plurality of different frames. The received hand tracking data may include data for one or both hands of a user.

In some embodiments, a gesture recognition machine, such as gesture recognition machine 216, may be configured to analyze the pixels of a depth map that correspond to the user, in order to determine what part of the user's body each pixel corresponds to. A variety of different body-part assignment techniques can be used to this end. In one example, each pixel of the depth map with an appropriate person index may be assigned a body-part index. The body-part index may include a discrete identifier, confidence value, and/or body-part probability distribution indicating the body part or parts to which that pixel is likely to correspond.

In some embodiments, machine-learning may be used to assign each pixel a body-part index and/or body-part probability distribution. The machine-learning approach analyzes a user with reference to information learned from a previously trained collection of known poses. During a supervised training phase, for example, a variety of human subjects may be observed in a variety of poses, including microgesture hand poses. Trainers provide ground truth annotations labeling various machine-learning classifiers in the observed data. The observed data and annotations are then used to generate one or more machine-learned algorithms that map inputs (e.g., depth video) to desired outputs (e.g., body-part indices for relevant pixels).

Figure 4B:
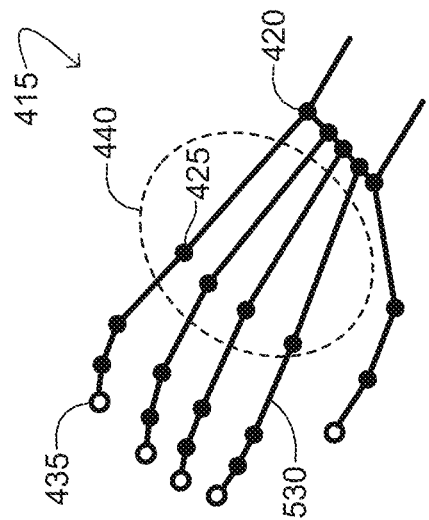
FIG. 4B shows aspects of a hand portion of an example virtual skeleton.
Figure 4A:
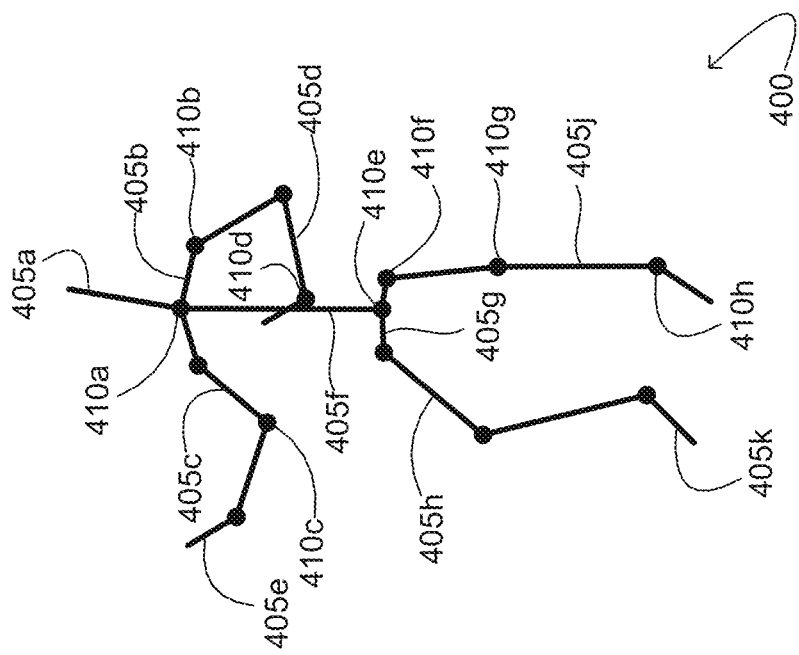
FIG. 4A shows aspects of an example virtual skeleton.

In some implementations, a virtual skeleton or other data structure for tracking feature positions (e.g., joints) may be fit to the pixels of depth and/or color video that correspond to the user. FIG. 4A shows an example virtual skeleton 400. The virtual skeleton includes a plurality of skeletal segments 405 pivotally coupled at a plurality of joints 410. In some embodiments, a body-part designation may be assigned to each skeletal segment and/or each joint. In FIG. 4A, the body-part designation of each skeletal segment 405 is represented by an appended letter: A for the head, B for the clavicle, C for the upper arm, D for the forearm, E for the hand, F for the torso, G for the pelvis, H for the thigh, J for the lower leg, and K for the foot. Likewise, a body-part designation of each joint 410 is represented by an appended letter: A for the neck, B for the shoulder, C for the elbow, D for the wrist, E for the lower back, F for the hip, G for the knee, and H for the ankle. Naturally, the arrangement of skeletal segments and joints shown in FIG. 4A is in no way limiting. A virtual skeleton consistent with this disclosure may include virtually any type and number of skeletal segments, joints, and/or other features.

In a more particular embodiment, point clouds (portions of a depth map) corresponding to the user's hands may be further processed to reveal the skeletal substructure of the hands. FIG. 4B shows an example hand portion 415 of a user's virtual skeleton 400. The hand portion includes wrist joints 420, finger joints 425, adjoining finger segments 430, and adjoining finger tips 435. Joints and segments may be grouped together to form a portion of the user's hand, such as palm portion 440.

Via any suitable minimization approach, the lengths of the skeletal segments and the positions and rotational angles of the joints may be adjusted for agreement with the various contours of a depth map. In this way, each joint is assigned various parameters—e.g., Cartesian coordinates specifying joint position, angles specifying joint rotation, and additional parameters specifying a conformation of the corresponding body part (hand open, hand closed, etc.). The virtual skeleton may take the form of a data structure including any, some, or all of these parameters for each joint. This process may define the location and posture of the imaged human subject. Some skeletal-fitting algorithms may use the depth data in combination with other information, such as color-image data and/or kinetic data indicating how one locus of pixels moves with respect to another. In the manner described above, a virtual skeleton may be fit to each of a sequence of frames of depth video. By analyzing positional change in the various skeletal joints and/or segments, the corresponding movements—e.g., gestures or actions of the imaged user—may be determined.

The foregoing description should not be construed to limit the range of approaches usable to construct a virtual skeleton 400 or otherwise identify various hand features, for hand features may be derived from a depth map and/or other sensor data in any suitable manner without departing from the scope of this disclosure.

Regardless of the method used to extract features, once identified, each feature may be tracked across frames of the depth and/or image data on a per-frame basis (e.g., 60 fps). The plurality of different hand features may include a plurality of finger features, a plurality of fingertip features, a plurality of thumbtip features, a plurality of knuckle features, a plurality of wrist features, a plurality of palm features, a plurality of dorsum features, etc. The features may be defined at a position in space, and represented by a series of spatial models and vectors.

In some examples, receiving hand tracking data for the first hand of the user includes receiving depth data for an environment, fitting a virtual skeleton to point clouds of the received depth data, assigning hand joints to the virtual skeleton, and tracking positions of the assigned hand joints across sequential depth images.

Returning to FIG. 3, at 310, method 300 optionally includes activating single-hand microgesture input responsive to recognizing an activation command from the user. In some examples, single-hand microgesture input may not be constitutively active, and thus may utilize a mechanism of entry to enable the system.

The activation command may be a gesture (e.g., user touches thumbtip to ring-finger tip), a hand pose (e.g., user holds right hand with palm generally facing left, index finger extended, middle finger generally pointing left), a voice command, gaze command, etc. Such activation commands may be customized by and for the user. Gesture and hand pose commands may be performed within the FOV of the imaging devices, but may not necessarily be within the FOV of the user.

At 315, method 300 includes assigning a set of microgesture targets to a plurality of positions along a length of a first finger of the hand of the user, each microgesture target including one or more software functions. In other words, once microgesture input is activated, a first finger may be segmented, and each of two or more of the segments assigned a microgesture target. Each position of the first finger so assigned thus belies an actuatable and interactable target that provides a function to the user.

As will be described further herein, each of the assigned targets may be selected by bringing a thumbtip into proximity of a finger position, maintaining the thumbtip in proximity of the finger position for a duration, and then selecting the corresponding target. The point of interaction for microgesture control is thus tightly tied to the user's hand, and/or to certain joints and segments on certain fingers. In this way, the first finger may effectively act as a controller as the user slides their thumbtip along the length of the finger. As used herein, a "first finger" may refer to any of the index finger, middle finger, ring finger, pinky finger, or any polydactyl finger on the hand of the user. A first finger may be pre-designated for use in microgesture input via user, application, and/or system preferences, or may be selected by the user for microgesture input, such as by proximity to the thumbtip. As described further herein, two or more fingers of the user may be concurrently activated for microgesture input.

Figure 5:
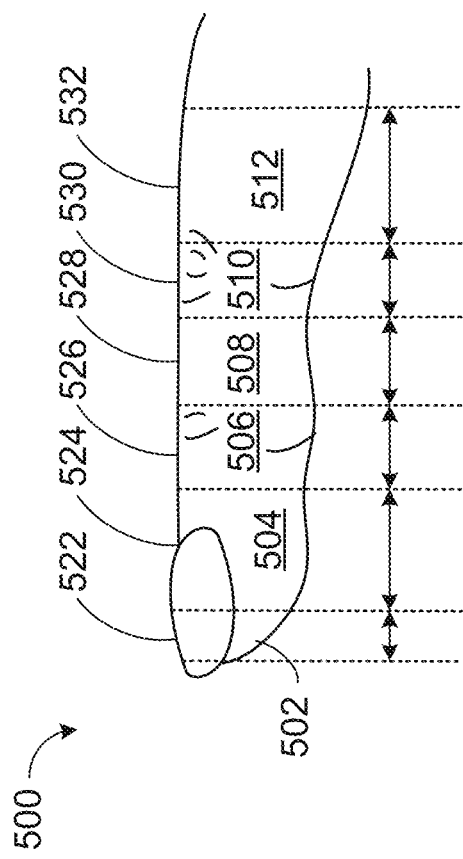
FIG. 5 illustrates an example of microgesture targets assigned to a finger of a user.

As an example, FIG. 5 illustrates an example of microgesture targets assigned to a positions along finger 500 of a user. In this example, each segment of the finger is given a position, including the fingertip 502, distal phalanx 504, distal interpharangeal joint 506, middle phalanx 508, proximal interpharangeal joint 510, and proximal phalanx 512. However, the number and distribution of positions may not be divided by anatomical segment, may not be equal in length, and may not be continuous. For example, finger 500 may be divided into thirds for the establishment of three different positions, or only the knuckles and fingertip given positions. As described further with regard to FIG. 7A, positions of the finger may be quantized or evaluated over a continuum, allowing for a plurality of microgesture targets to be assigned to finger 500. Each position along finger 500 may then be assigned a microgesture target, e.g., fingertip 502 is assigned target 522, distal phalanx 504 is assigned target 524, distal interpharangeal joint 506 is assigned target 526, middle phalanx 508 is assigned target 528, proximal interpharangeal joint 510 is assigned target 530, and proximal phalanx 512 is assigned target 532. Each microgesture target may be associated with a unique function. For example, set of microgesture targets for a media application may include targets that are software operations actuatable to cause play, pause, rewind, fast-forward, skip, repeat, etc. A set of microgesture targets for a drawing application may include targets for a plurality of colors.

Returning to FIG. 3, at 320, method 300 includes providing a visual affordance to the user, the visual affordance including indicators for two or more assigned microgesture targets. In this way, the user may be provided a visual indicator that informs the user as to which position is being approached, and thus which target(s) may be selected, as the user moves their thumbtip along the first finger.

While the microgesture targets themselves may be assigned to positions on the first finger, the visual affordance may not be directly attached to the hand. For example, some of the positions may be obscured from view based on the conformation of the user's hand. Further, there may be a lag in hand tracking and re-positioning affordances on the display.

As such, in some examples, the visual affordance includes a first affordance that is displayed as being tethered to the hand of the user at a threshold distance, so that the indicators for the assigned microgesture targets are not coincident with the corresponding positions along the length of the first finger.

Figure 6:
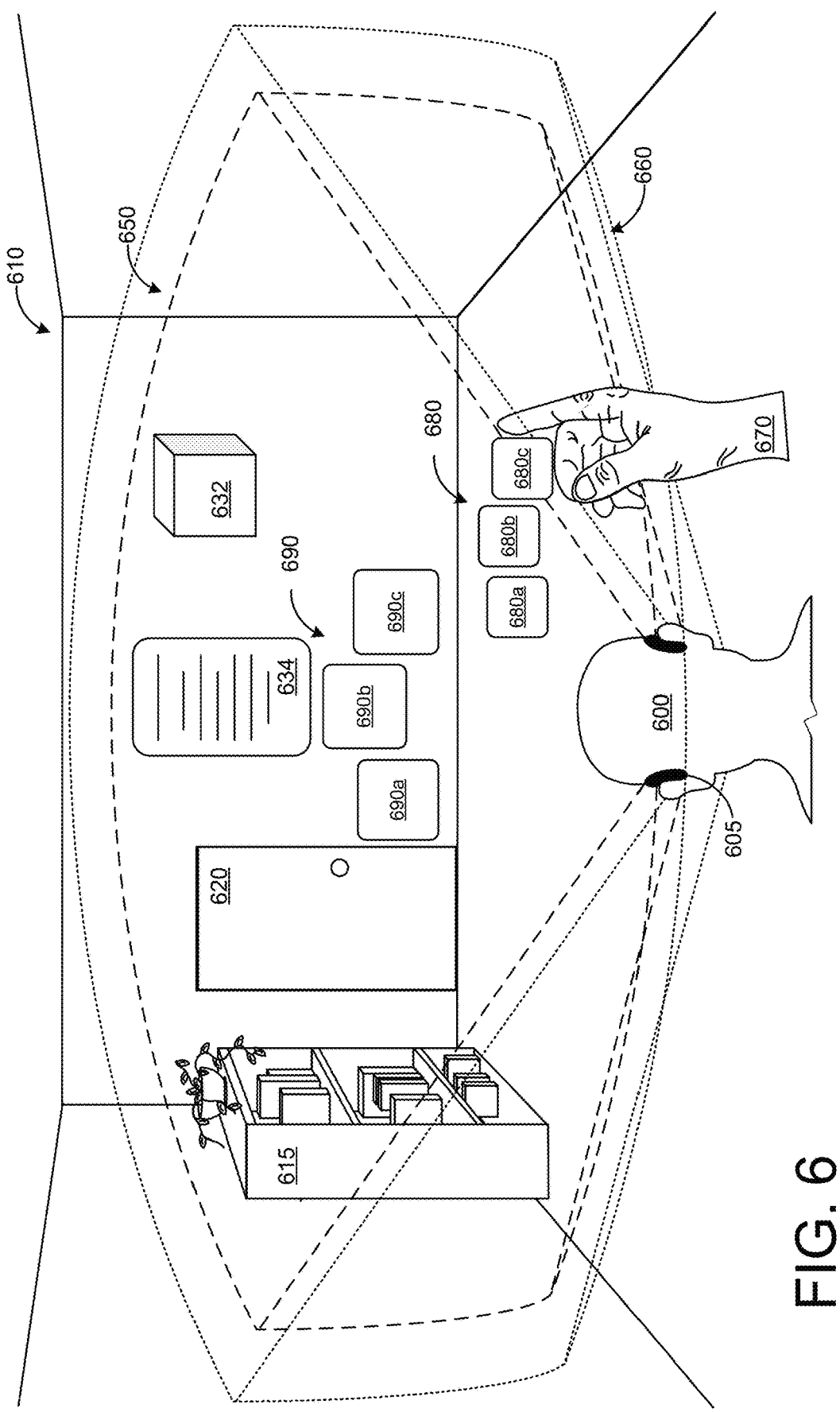
FIG. 6 illustrates example visual affordances provided to a user performing single-handed microgestures.

As an example, FIG. 6 shows a user 600 wearing head-mounted display device 605 and standing in the real-world physical environment of room 610. Room 610 includes physical objects, such as bookcase 615 and door 620. Head-mounted display device 605 is shown displaying virtual content to user 600, including holographic cube 632 and holographic display monitor 634. Head-mounted display device 605 has a display field-of-view 650, indicated by dashed lines, and an imaging field-of-view 660, indicated by dotted lines.

Hand 670 of user 600 is illustrated performing microgestures using a thumbtip and middle finger. Hand 670 is shown as being within both display field-of-view 650 and imaging field-of-view 660. A first visual affordance 680 is shown with three microgesture target indicators (680a, 680b, 680c). In this example, the indicators for the microgesture targets are presented in an order based on corresponding positions along the length of the first finger, e.g., indicator 680a corresponds to a target at the fingertip, indicator 680b corresponds to a target at the distal interpharangeal joint, and indicator 680c corresponds to a target at the proximal interpharangeal joint.

In particular, novice users may rely on the first affordance to learn where to stop, where to scroll, etc. to engage particular targets. However, more advanced users may intuitively understand where the target-associated positions are along the finger, and may not rely on such a visual affordance. As such, in some examples, an appearance of the first affordance may be progressively reduced based on the user repeatedly selecting microgesture targets over time. Once muscle memory has been built, the microgestures may be performed in the absence of such visual feedback. Indeed, the microgestures may be performed outside of the user's FOV, assuming they are performed within the camera's FOV and can be detected by the imaging sensors.

Additionally or alternatively, the visual affordance may include a second affordance that is presented within a field-of-view of the user at a display location not dependent on a position of the hand of the user. As shown in FIG. 6, second visual affordance 690 is shown with three microgesture target indicators (690a, 690b, 690c). Although in this example, first visual affordance 680 and second visual affordance 690 present the same information, they may provide different or complementary information in other examples.

The second affordance may thus be presented on the display as floating out in front of the user, enabling the user to look up and get visual feedback as to target interaction. For example, a position of the second affordance may be based on a gaze direction of the user or may be body-locked to the user. However, the second affordance may be placed anywhere based on user preferences, and the placement may be adjusted based on the active microgesture controls. For example, controls for a real-world or virtual object may be displayed at or nearby the object (e.g., volume controls for a stereo, channel controls for a television) or otherwise at a position in the environment in a world-locked fashion. In some examples, the object may be rendered to be moving within the environment, and thus the second affordance may move based on movement of the object. Indeed, the properties of the object itself may change based on microgesture input, and thus the object may be configured as a second or additional affordance in order to provide feedback to the user about their pending selection.

Returning to FIG. 3, at 325 method 300 includes actions based on an output of a gesture recognition machine configured to analyze the received hand tracking data. At 330, method 300 includes determining a location of a thumbtip of the hand of the user relative to the plurality of positions along the length of the first finger. The location of the thumbtip may be determined using hand tracking techniques as described with regard to FIGS. 4A and 4B. Once a first finger has been identified, the hand tracking may be simplified. For example, the first finger may provide a frame of reference for tracking a position of the thumbtip, reducing drift that typically occurs in free space, and making it easier for the gesture recognition engine to discern where the thumbtip is relative to the plurality of positions along the length of the first finger. The two known objects, both visible to the imaging devices, can be extracted from the image data, and only a subset of finger features analyzed, allowing for the gesture recognition engine to track fine-grained, continuous movements of the thumbtip. However, microgesture input may be deactivated if there is tracking corruption, such as occurs when a hand is too close to another hand or other surface.

Figure 7A:
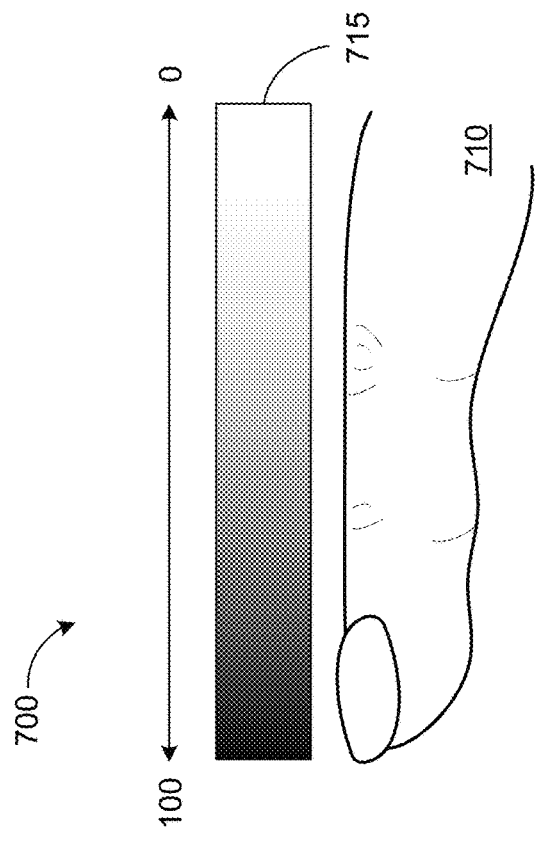
FIG. 7A shows an example of a continuum of positions assigned to a finger.

As shown in FIG. 5, the target positions along the length of the first finger may be assigned to finger segments, finger joints, fingertips, and subsections thereof. However, the position of the thumbtip along the length of the first finger may be determined using finer delineation points, allowing for a greater number of targets and/or greater discernment between a modest number of targets. For example, the gesture recognition machine may configured to determine a position of the thumbtip along a continuum of positions along the length of the first finger. An example thereof is shown in FIG. 7A, where, at 700, finger 710 is assigned a continuum 715 of positions. As shown, positions 715 are evaluated from a value of 0 at the proximal end of finger 710 to a value of 100 at the fingertip of finger 710. However, this is merely an example. Targets may be assigned to segments of continuum 715, e.g. as shown in FIG. 5, and/or a single output may be evaluated over a continuum 715. Such a gradient of positions may be linear, exponential, tapered, etc. even if continuum 715 maps to discrete targets. For example, finger 710 may be used as a potentiometer, fader, scroll bar, etc. to output one or more values based on the position of a thumbtip on continuum 715. This may enable the use of single-handed microgestures to control properties of objects akin to a volume knob.

Figure 7B:
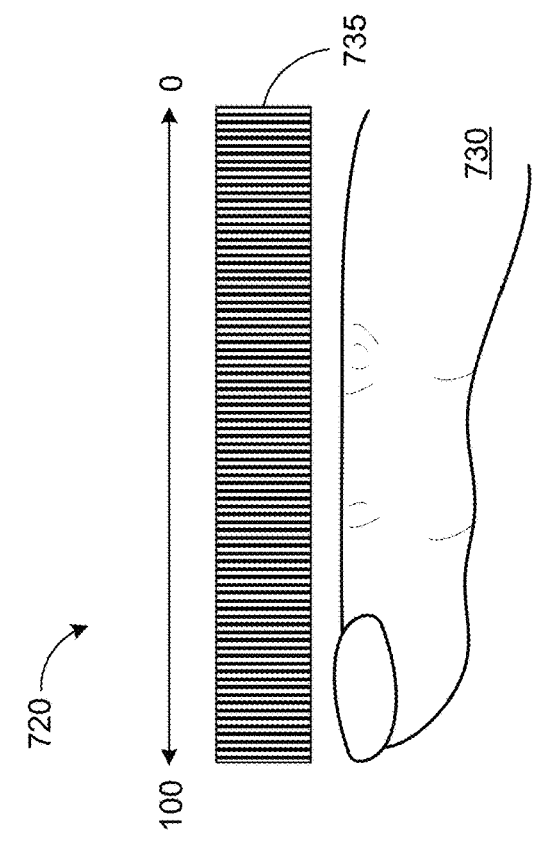
FIG. 7B shows an example of a quantized set of positions assigned to a finger.

Additionally or alternatively, the continuum of positions along the length of the first finger may be divided into to a plurality of discrete positions for microgesture target assignment. An example thereof is shown in FIG. 7B, where, at 720, finger 730 is assigned a quantized set 735 of positions. As shown, positions 735 are evaluated from a value of 0 at the proximal end of finger 730 to a value of 100 at the fingertip of finger 730.

The scenarios illustrated in FIGS. 7A and 7B allow for continuous motion and scrolling, even if the end results are discrete, thresholded targets. As such, a single hand may be used to achieve continuous control over a parameter through scrolling, and the microgestures are not limited to a modest number of actions through tap and release gestures. Indeed, sets of microgesture targets may be assigned to a plurality of positions along a length of two or more fingers of the user, allowing for up to four different fader-style controls on a single hand, with a plurality of control target options.

In some examples, the visual affordance may display a subset of the indicators for the assigned microgesture targets, the displayed subset of indicators based on the location of the thumbtip of the hand of the user relative to the plurality of positions along the length of the first finger. For example, a visual affordance volume knob control may only display a limited number of values on either side of the value corresponding to the current thumbtip position along the active finger. As the thumbtip moves along the finger, the local position and associated values change, and thus the values presented at the visual affordance may be adjusted accordingly.

Returning to FIG. 3, at 335, method 300 includes, responsive to determining that the thumbtip is within a threshold distance of the first finger at a first position along the length of the first finger, augmenting an indicator for a corresponding first microgesture target. In some examples, the threshold distance between the thumbtip and first finger may be zero, indicating that the thumbtip and first finger are in direct contact with each other. In this way, both the user and the gesture recognition machine are provide with an anchor with which to determine motion of the thumbtip relative to the first finger. In some scenario, the threshold distance may be a non-zero number, however, such a threshold may be particularly stringent when more than one finger is assigned microgesture targets. As used herein, determining that the thumbtip is at a first position may include determining that at least a threshold portion of the thumbtip overlaps with the first position of the first finger. Particularly where multiple positions are placed adjacently along a finger, a center line of the thumbtip may be determined and compared to the position along the finger to determine whether the thumbtip is located at the first position along the length of the first finger.

Figure 8B:
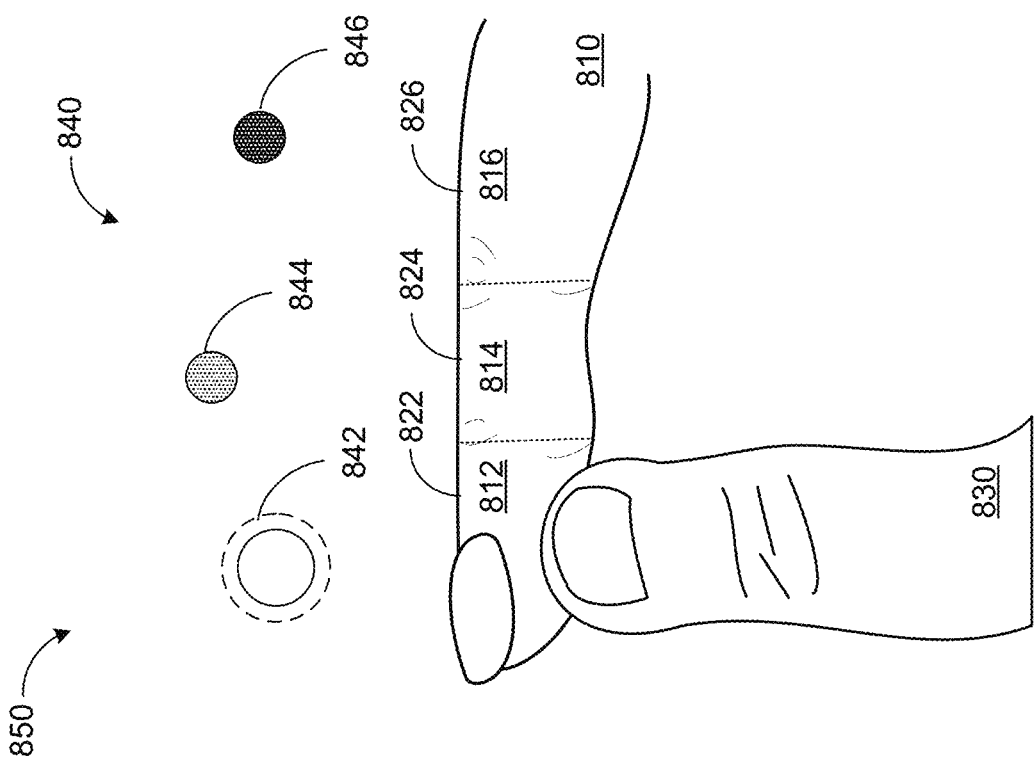
FIG. 8B shows an example of a further augmented indicator for a first microgesture target on a finger of a user.
Figure 8A:
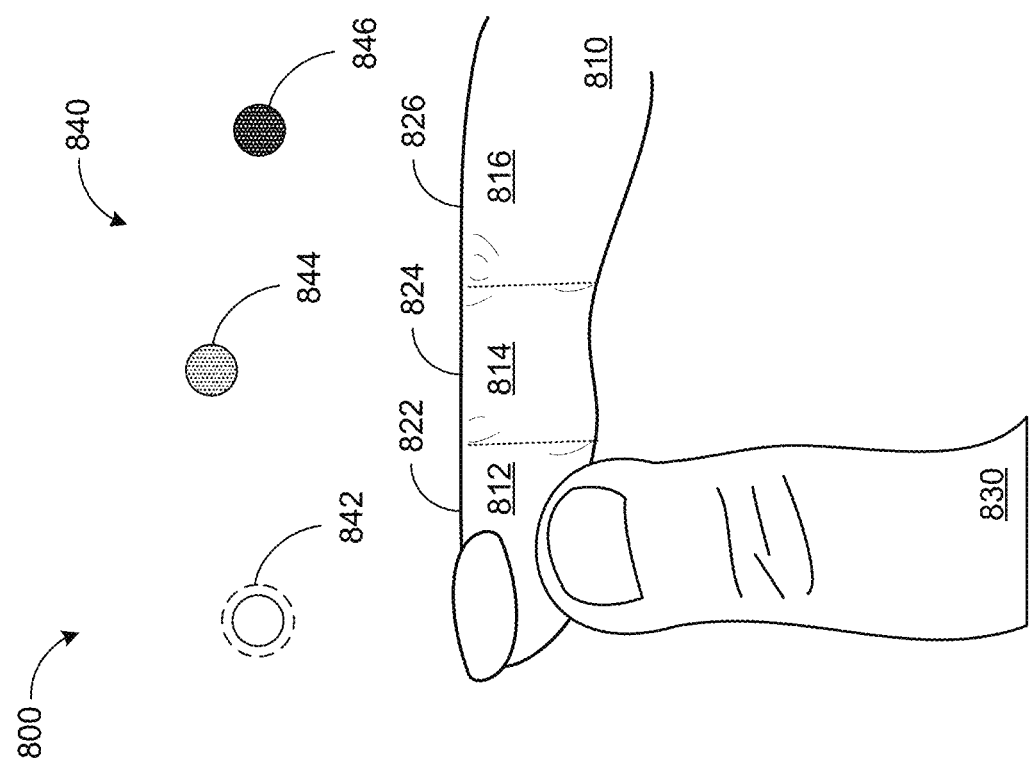
FIG. 8A shows an example of an augmented indicator for a first microgesture target on a finger of a user.

As shown at 800 in FIG. 8A, a first finger 810 is assigned three positions (812, 814, and 816, delineated by dashed lines), each assigned a microgesture target (822, 824, 826). Thumbtip 830 is illustrated as being within a threshold distance of finger 810 at first position 812. A visual affordance 840 includes three indicators which correlate with each of the three microgesture targets. Indicator 842 corresponds with first position 812 and microgesture target 822, indicator 844 corresponds with second position 814 and microgesture target 824, and indicator 846 corresponds with third position 816 and microgesture target 826. As thumbtip 830 is at first position 812, indicator 842 is highlighted, indicating to the user that corresponding microgesture target 822 is currently being targeted for selection.

Returning to FIG. 3, at 340, method 300 includes further augmenting the indicator of the first microgesture target based on a duration the thumbtip is at the first position. This is shown at 850 in FIG. 8B. As thumbtip 830 dwells at first position 812, indicator 842 is expanded, indicating to the user that corresponding microgesture target 822 is currently able to be selected. While shown as a first (hand-tethered) visual affordance, a second visual affordance may concurrently be augmented in the same fashion.

Returning to FIG. 3, at 345, method 300 includes, responsive to detecting a confirmation action, executing the corresponding microgesture target. In some examples, the confirmation action includes a dwell time at the first position greater than a threshold. In this way, the time threshold may act as a pre-activation stage where the user is presented an augmented indicator for a duration, resulting in selection of the corresponding microgesture target. In the example of FIGS. 8A and 8B, this may include maintaining thumbtip 830 at first position 812 for a threshold duration.

Additionally or alternatively, the confirmation action may include a predetermined gesture. The predetermined gesture may be performed by the hand of the user, such as flicking the thumbtip away from the first finger, pulling the thumbtip back, etc. In some examples, the confirmation action may be based on a gaze direction of the user, such as the user looking at an indicator of the second affordance.

Optionally, such as in the absence of detecting a confirmation action, method 300 may include, at 350, responsive to determining that the thumbtip has moved to a second position along the length of the first finger, augmenting an indicator for a corresponding second microgesture target. Further, at 355, method 300 may include further augmenting the indicator of the second microgesture target based on a duration the thumbtip is within the threshold distance of the second position.

Figure 9B:
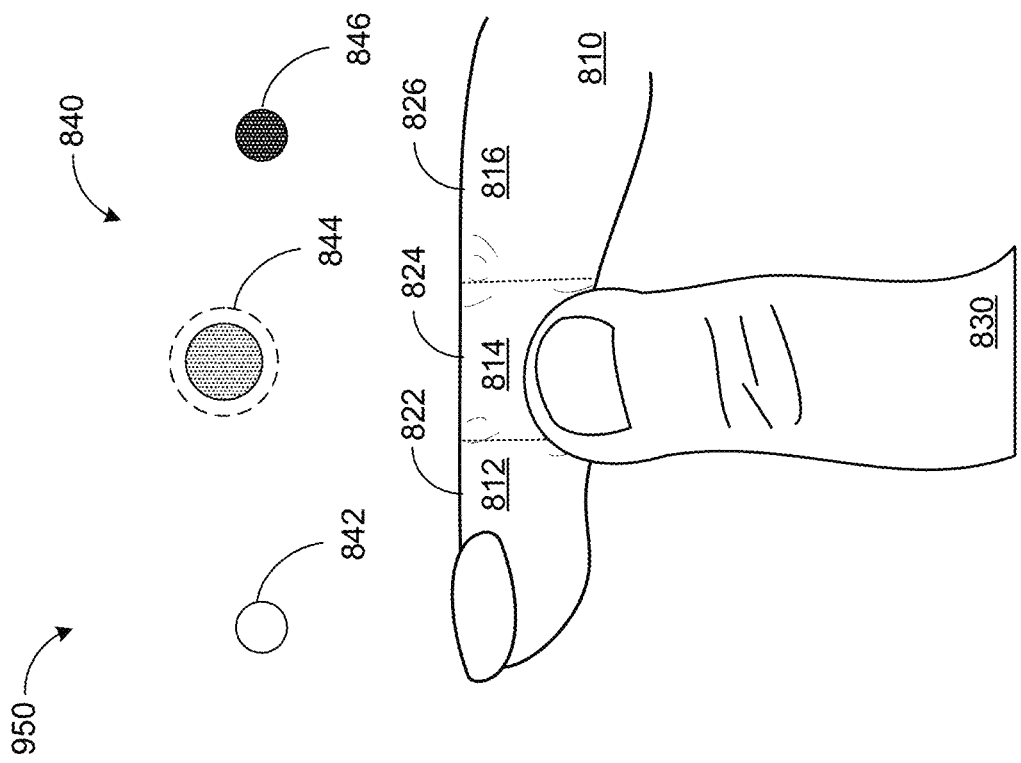
FIG. 9B shows an example of a further augmented indicator for a second microgesture target on a finger of a user.
Figure 9A:
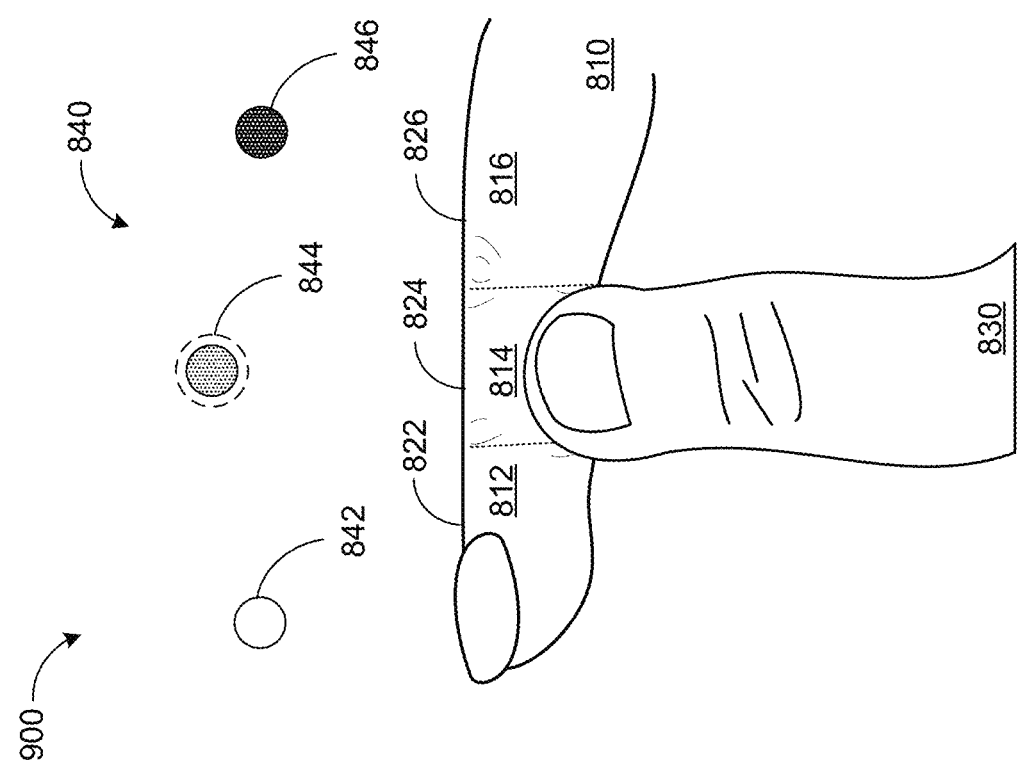
FIG. 9A shows an example of an augmented indicator for a second microgesture target on a finger of a user.

As shown at 900 in FIG. 9A, thumbtip 830 is illustrated as moving from the first position 812 (as shown in FIGS. 8A and 8B) to the second position 814. As such, indicator 844 is highlighted, indicating to the user that corresponding microgesture target 824 is currently being targeted for selection, while indicator 842 has returned to a baseline visual status. At 950 in FIG. 9B, as thumbtip 830 dwells at second position 814, indicator 844 is expanded, indicating to the user that corresponding microgesture target 824 is currently able to be selected.

In some scenarios, selection of a microgesture target may cause temporary deactivation of single-handed microgesture controls, for example if selection of the target were to cause the user to activate an input mechanism for an active application (e.g., select a color for a painting application). In other scenarios, deactivation may be triggered by a specific gesture. In some examples, the same activation gesture may be used to deactivate microgesture controls (e.g., touch thumbtip to ring fingertip once to activate, again to deactivate). Additionally or alternatively, deactivation may occur in response to the user adopting a non-specific hand pose, by moving the hand outside the FOV of the imaging devices, by gazing specifically at a display object, by gazing non-specifically at a corner of the display, etc.

By combining continuous positional evaluation along the length of a finger with multi-finger and/or multi-handed input, a user can leverage single-handed microgestures into multi-functional controls that may be applied to virtual and/or real-world objects. In some examples, a second hand may be invoked for microgesture controls.

Figure 10:
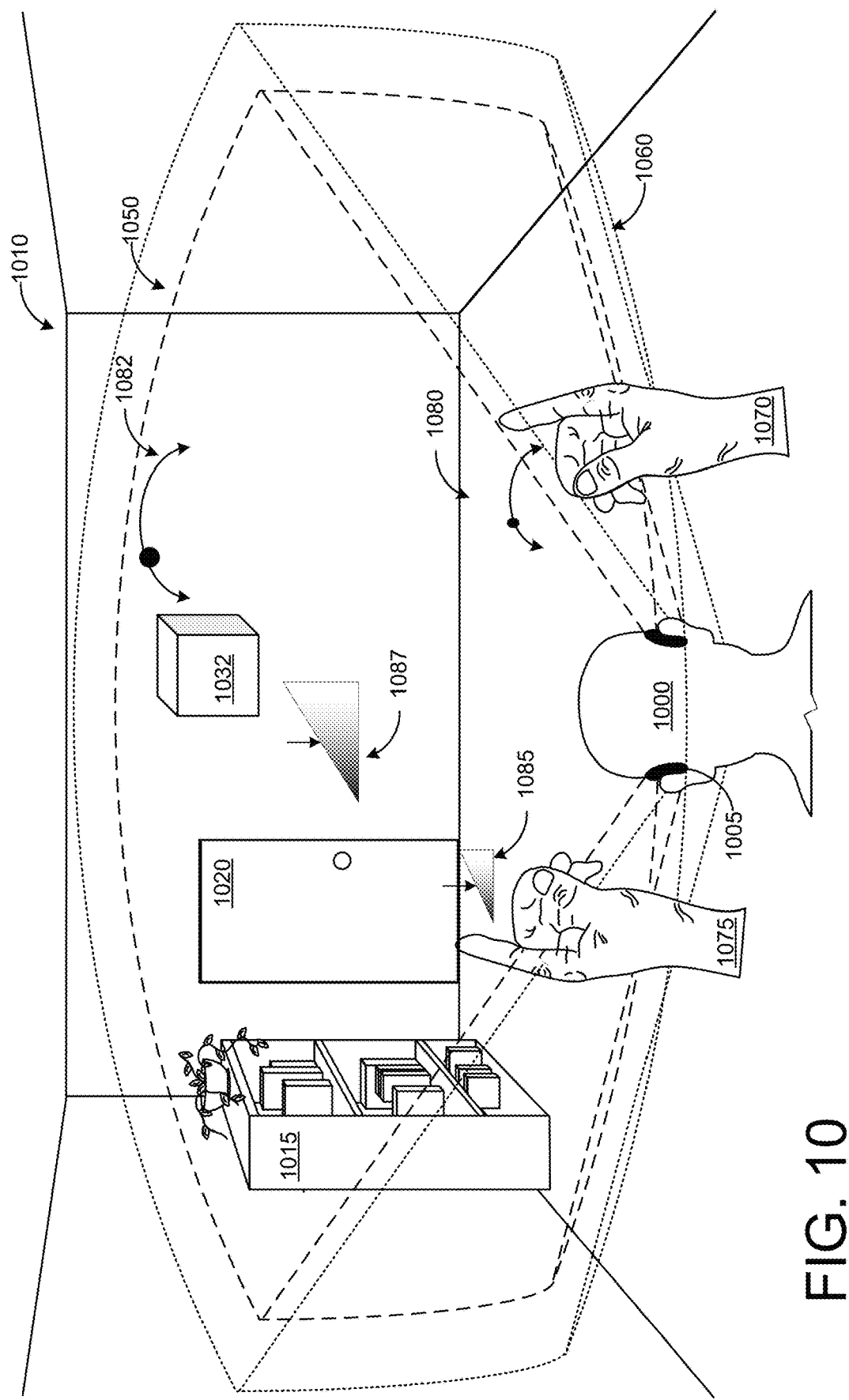
FIG. 10 illustrates example controls conducted through single-handed microgesture input.

FIG. 10 illustrates example controls conducted through single-handed microgesture input. FIG. 10 shows a user 1000 wearing head-mounted display device 1005 and standing in the real-world physical environment of room 1010. Room 1010 includes physical objects, such as bookcase 1015 and door 1020. Head-mounted display device 1005 is shown displaying virtual content to user 1000, including holographic cube 1032. Head-mounted display device 1005 has a display field-of-view 1050, indicated by dashed lines, and an imaging field-of-view 1060, indicated by dotted lines. Hand tracking data may be assigned for a second hand of a user. A second set of microgesture targets may be assigned to a plurality of positions along a length of a first finger of the second hand of the user. Based on output of the gesture recognition machine, a location of a thumbtip of the second hand of the user may be determined relative to the plurality of positions along the length of the first finger of the second hand of the user. Responsive to detecting a confirmation action, an action may be performed as assigned to the corresponding microgesture target on the second hand.

Hands 1070 and 1075 of user 1000 are illustrated performing microgestures using a thumbtip and middle finger. Both hands 1070 and 1075 are shown as being within both display field-of-view 1050 and imaging field-of-view 1060.

A first visual affordance 1080 and second visual affordance 1082 are associated with hand 1070, while a third visual affordance 1085 and second visual affordance 1087 are associated with hand 1075. In this example, user 1000 is using microgesture controls to manipulate holographic cube 1032, with hand 1070 controlling rotation of holographic cube 1032 and hand 1075 manipulating the size of holographic cube 1032.

User 1000 may additionally use other fingers or switch control sets assigned to the middle fingers of each hand to provide compass control (forward, backward, left, right), rotation in multiple dimensions, and otherwise control the position and orientation of holographic cube 1032 in space.

Combining microgestures on two different hands may allow for scrolling in two dimensions simultaneously, separation of course/fine scrolling controls, etc.

Additionally, the thumb of each hand may provide additional input information along with position along and proximity to a finger. In some examples, moving the thumb in front of and/or behind the finger may be interpreted as an additional command. Additionally or alternatively, the thumb angle relative to a finger may be an input. Such input may be used to activate or confirm a selected target, to generate an additional control value, to act as a joystick button, etc.

Additionally or alternatively, the combined microgesture controls may be used to quickly navigate a menu hierarchy without requiring the user to view every possible selection. Controls may be assigned to go up or down a level of content, to select a menu item, etc. In some examples, movement of the thumbtip along the finger (e.g., position, velocity, acceleration, trajectory) may be used to performed weighted scrolling, friction scrolling, flinging of a series of targets, etc. As such, repeated movements in one direction may be used to quickly scroll through a series of options, with only some options visible or actuatable at once, depending on the virtual position of the thumbtip along a continuum.

In some embodiments, the methods and processes described herein may be tied to a computing system of one or more computing devices. In particular, such methods and processes may be implemented as a computer-application program or service, an application-programming interface (API), a library, and/or other computer-program product.

Figure 11:
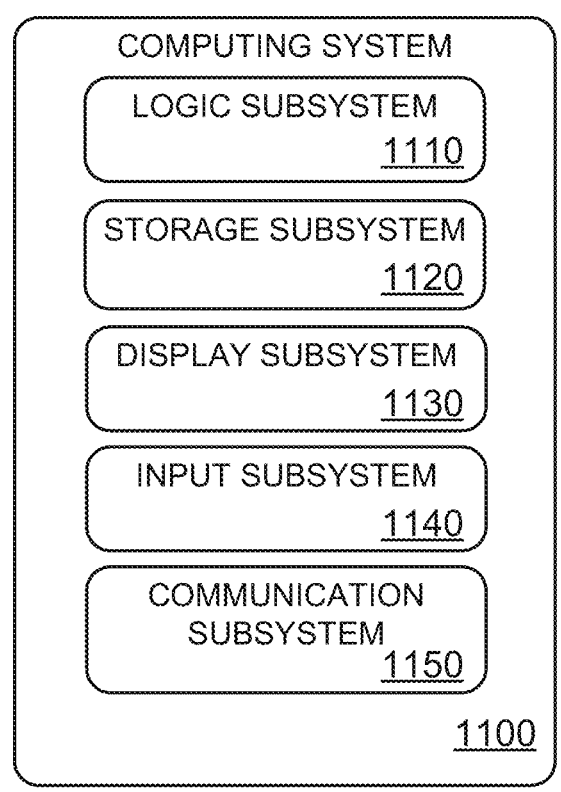
FIG. 11 shows a schematic view of an example computing device.

FIG. 11 schematically shows a non-limiting embodiment of a computing system 1100 that can enact one or more of the methods and processes described above. Computing system 1100 is shown in simplified form. Computing system 1100 may take the form of one or more personal computers, server computers, tablet computers, home-entertainment computers, network computing devices, gaming devices, mobile computing devices, mobile communication devices (e.g., smart phone), and/or other computing devices.

Computing system 1100 includes a logic machine 1110 and a storage machine 1120. Computing system 1100 may optionally include a display subsystem 1130, input subsystem 1140, communication subsystem 1150, and/or other components not shown in FIG. 11.

Logic machine 1110 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 1120 includes one or more physical devices configured to hold instructions executable by the logic machine to implement the methods and processes described herein. When such methods and processes are implemented, the state of storage machine 1120 may be transformed—e.g., to hold different data.

Storage machine 1120 may include removable and/or built-in devices. Storage machine 1120 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 1120 may include volatile, nonvolatile, dynamic, static, read/write, read-only, random-access, sequential-access, location-addressable, file-addressable, and/or content-addressable devices.

It will be appreciated that storage machine 1120 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 1110 and storage machine 1120 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 1100 implemented to perform a particular function. In some cases, a module, program, or engine may be instantiated via logic machine 1110 executing instructions held by storage machine 1120. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 1130 may be used to present a visual representation of data held by storage machine 1120. This visual representation may take the form of a graphical user interface (GUI). As the herein described methods and processes change the data held by the storage machine, and thus transform the state of the storage machine, the state of display subsystem 1130 may likewise be transformed to visually represent changes in the underlying data. Display subsystem 1130 may include one or more display devices utilizing virtually any type of technology. Such display devices may be combined with logic machine 1110 and/or storage machine 1120 in a shared enclosure, or such display devices may be peripheral display devices.

When included, input subsystem 1140 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 1150 may be configured to communicatively couple computing system 1100 with one or more other computing devices. Communication subsystem 1150 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 1110 to send and/or receive messages to and/or from other devices via a network such as the Internet.

In one example, a method for single-handed microgesture input comprises receiving hand tracking data for a hand of a user; assigning a set of microgesture targets to a plurality of positions along a length of a first finger of the hand of the user, each microgesture target including one or more software functions; providing a visual affordance to the user, the visual affordance including indicators for two or more assigned microgesture targets; and based on an output of a gesture recognition machine configured to analyze the received hand tracking data: determining a location of a thumbtip of the hand of the user relative to the plurality of positions along the length of the first finger; responsive to determining that the thumbtip is within a threshold distance of the first finger at a first position along the length of the first finger, augmenting an indicator of a first microgesture target corresponding to such first position; and further augmenting the indicator of the first microgesture target based on a duration the thumbtip is at the first position; and responsive to detecting a confirmation action, executing the corresponding first microgesture target. In such an example, or any other example, the visual affordance additionally or alternatively includes a first affordance that is tethered to the hand of the user at a predetermined distance, so that the indicators for the assigned microgesture targets are not coincident with corresponding positions along the length of the first finger. In any of the preceding examples, or any other example, an appearance of the first affordance is additionally or alternatively progressively reduced based on the user repeatedly selecting microgesture targets over time. In any of the preceding examples, or any other example, the visual affordance additionally or alternatively includes a second affordance that is presented within a field-of-view of the user at a display location not dependent on a location of the hand of the user. In any of the preceding examples, or any other example, the display location of the second affordance is additionally or alternatively based on a gaze direction of the user. In any of the preceding examples, or any other example, the second affordance is additionally or alternatively body-locked to the user. In any of the preceding examples, or any other example, the indicators for the microgesture targets are additionally or alternatively presented in an order based on corresponding positions along the length of the first finger. In any of the preceding examples, or any other example, the method additionally or alternatively comprises activating single-handed microgesture input responsive to recognizing an activation command from the user. In any of the preceding examples, or any other example, the method additionally or alternatively comprises, responsive to determining that the thumbtip has moved to a second position along the length of the first finger, augmenting an indicator for a corresponding second microgesture target; and further augmenting the indicator of the second microgesture target based on a duration the thumbtip is within the threshold distance of the second position. In any of the preceding examples, or any other example, the gesture recognition machine is additionally or alternatively configured to determine a position of the thumbtip along a continuum of positions along the length of the first finger. In any of the preceding examples, or any other example, the continuum of positions along the length of the first finger are additionally or alternatively divided into to a plurality of discrete positions for microgesture target assignment. In any of the preceding examples, or any other example, the visual affordance additionally or alternatively displays a subset of the indicators for the assigned microgesture targets, the displayed subset of indicators based on the location of the thumbtip of the hand of the user relative to the plurality of positions along the length of the first finger. In any of the preceding examples, or any other example, the confirmation action additionally or alternatively includes a dwell time at the first position greater than a threshold. In any of the preceding examples, or any other example, the confirmation action additionally or alternatively includes a predetermined gesture. In any of the preceding examples, or any other example, sets of microgesture targets are additionally or alternatively assigned to pluralities of positions along a length of two or more fingers of the hand of the user. In any of the preceding examples, or any other example, the method additionally or alternatively comprises receiving hand tracking data for a second hand of a user; assigning a second set of microgesture targets to a plurality of positions along a length of a first finger of the second hand of the user; based on output of the gesture recognition machine, determining a location of a thumbtip of the second hand of the user relative to the plurality of positions along the length of the first finger of the second hand of the user; and responsive to detecting a confirmation action, executing the corresponding microgesture target. In any of the preceding examples, or any other example, receiving hand tracking data for the hand of the user additionally or alternatively includes receiving depth data for an environment; fitting a virtual skeleton to point clouds of the received depth data; assigning hand joints to the virtual skeleton based at least in part on image data of the user performing the first-stage gesture and the second-stage gesture; and tracking positions of the assigned hand joints across sequential depth images.

In another example, a system for a head-mounted display comprises one or more outward-facing image sensors; a display device configured to present virtual content; and a gesture recognition machine configured to: receive hand tracking data for a hand of a user via the one or more outward facing image sensors; assign a set of microgesture targets to a plurality of positions along a length of a first finger of the hand of the user, each microgesture target including one or more software functions; provide a visual affordance to the user, the visual affordance including indicators for two or more assigned microgesture targets; determine a location of a thumbtip of the hand of the user relative to the plurality of positions along the length of the first finger; responsive to determining that the thumbtip is within a threshold distance of the first finger at a first position along the length of the first finger, augment an indicator for a corresponding first microgesture target; further augment the indicator of the first microgesture target based on a duration the thumbtip is at the first position; and responsive to detecting a confirmation action, executing the corresponding microgesture target. In such an example, or any other example, the gesture recognition machine is additionally or alternatively configured to, responsive to determining that the thumbtip has moved to a second position along the length of the first finger, augment an indicator for a corresponding second microgesture target; and further augment the indicator of the second microgesture target based on a duration the thumbtip is within the threshold distance of the second position.

In yet another example, a method for single-handed microgesture input comprises receiving hand tracking data for a hand of a user; assigning a set of microgesture targets to a plurality of positions along a length of a first finger of the hand of the user; providing a visual affordance to the user, the visual affordance including indicators for two or more assigned microgesture targets, the visual affordance including a first affordance that is tethered to the hand of the user at a threshold distance, so that the indicators for the assigned microgesture targets are not coincident with the corresponding positions along the length of the first finger, and further including a second affordance that is presented within a field-of-view of the user at a position not dependent on a position of the hand of the user; and based on an output of a gesture recognition machine configured to analyze the received hand tracking data: determining a location of a thumbtip of the hand of the user along a continuum of positions along the length of the first finger, the continuum of positions along the length of the first finger divided into to a plurality of discrete positions for microgesture target assignment; responsive to determining that the thumbtip is within a threshold distance of the first finger at a first position along the length of the first finger, augmenting an indicator for a corresponding first microgesture target; and further augmenting the indicator of the first microgesture target based on a duration the thumbtip is at the first position; and responsive to detecting a confirmation action, executing the corresponding microgesture target.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for single-handed microgesture input, comprising:
  receiving hand tracking data for a hand of a user;
  assigning a set of microgesture targets to a plurality of positions along a length of a first finger of the hand of the user, each microgesture target including one or more software functions;
  providing a visual affordance to the user, the visual affordance including indicators for two or more assigned microgesture targets; and
  based on an output of a gesture recognition machine configured to analyze the received hand tracking data:
    determining a location of a thumbtip of the hand of the user relative to the plurality of positions along the length of the first finger;
    responsive to determining that the thumbtip is within a threshold distance of the first finger at a first position along the length of the first finger, augmenting an indicator of a first microgesture target corresponding to such first position; and
    further augmenting the indicator of the first microgesture target based on a duration the thumbtip is at the first position; and
  responsive to detecting a confirmation action, executing the corresponding first microgesture target.

2. The method of claim 1, wherein the visual affordance includes a first affordance that is tethered to the hand of the user at a predetermined distance, so that the indicators for the assigned microgesture targets are not coincident with corresponding positions along the length of the first finger.

3. The method of claim 2, wherein an appearance of the first affordance is progressively reduced based on the user repeatedly selecting microgesture targets over time.

4. The method of claim 2, wherein the visual affordance includes a second affordance that is presented within a field-of-view of the user at a display location not dependent on a location of the hand of the user.

5. The method of claim 4, wherein the display location of the second affordance is based on a gaze direction of the user.

6. The method of claim 4, wherein the second affordance is body-locked to the user.

7. The method of claim 1, wherein the indicators for the microgesture targets are presented in an order based on corresponding positions along the length of the first finger.

8. The method of claim 1, further comprising:
  activating single-handed microgesture input responsive to recognizing an activation command from the user.

9. The method of claim 1, further comprising:
  responsive to determining that the thumbtip has moved to a second position along the length of the first finger, augmenting an indicator for a corresponding second microgesture target; and
  further augmenting the indicator of the second microgesture target based on a duration the thumbtip is within the threshold distance of the second position.

10. The method of claim 9, wherein the gesture recognition machine is configured to determine a position of the thumbtip along a continuum of positions along the length of the first finger.

11. The method of claim 10, where the continuum of positions along the length of the first finger are divided into to a plurality of discrete positions for microgesture target assignment.

12. The method of claim 9, wherein the visual affordance displays a subset of the indicators for the assigned microgesture targets, the displayed subset of indicators based on the location of the thumbtip of the hand of the user relative to the plurality of positions along the length of the first finger.

13. The method of claim 1, wherein the confirmation action includes a dwell time at the first position greater than a threshold.

14. The method of claim 1, wherein the confirmation action includes a predetermined gesture.

15. The method of claim 1, wherein sets of microgesture targets are assigned to pluralities of positions along a length of two or more fingers of the hand of the user.

16. The method of claim 1, further comprising:
receiving hand tracking data for a second hand of a user;
assigning a second set of microgesture targets to a plurality of positions along a length of a first finger of the second hand of the user;
based on output of the gesture recognition machine, determining a location of a thumbtip of the second hand of the user relative to the plurality of positions along the length of the first finger of the second hand of the user; and
responsive to detecting a confirmation action, executing the corresponding microgesture target.

17. The method of claim 1, wherein receiving hand tracking data for the hand of the user includes:
receiving depth data for an environment;
fitting a virtual skeleton to point clouds of the received depth data;
assigning hand joints to the virtual skeleton based at least in part on image data of the user performing the first-stage gesture and the second-stage gesture; and
tracking positions of the assigned hand joints across sequential depth images.

18. A system for a head-mounted display, comprising:
one or more outward-facing image sensors;
a display device configured to present virtual content; and
a gesture recognition machine configured to:
receive hand tracking data for a hand of a user via the one or more outward facing image sensors;
assign a set of microgesture targets to a plurality of positions along a length of a first finger of the hand of the user, each microgesture target including one or more software functions;
provide a visual affordance to the user, the visual affordance including indicators for two or more assigned microgesture targets;
determine a location of a thumbtip of the hand of the user relative to the plurality of positions along the length of the first finger;
responsive to determining that the thumbtip is within a threshold distance of the first finger at a first position along the length of the first finger, augment an indicator for a corresponding first microgesture target;
further augment the indicator of the first microgesture target based on a duration the thumbtip is at the first position; and
responsive to detecting a confirmation action, execute the corresponding microgesture target.

19. The system of claim 18, wherein the gesture recognition machine is further configured to:
responsive to determining that the thumbtip has moved to a second position along the length of the first finger, augment an indicator for a corresponding second microgesture target; and
further augment the indicator of the second microgesture target based on a duration the thumbtip is within the threshold distance of the second position.

20. A method for single-handed microgesture input, comprising:
receiving hand tracking data for a hand of a user;
assigning a set of microgesture targets to a plurality of positions along a length of a first finger of the hand of the user;
providing a visual affordance to the user, the visual affordance including indicators for two or more assigned microgesture targets, the visual affordance including a first affordance that is tethered to the hand of the user at a threshold distance, so that the indicators for the assigned microgesture targets are not coincident with the corresponding positions along the length of the first finger, and further including a second affordance that is presented within a field-of-view of the user at a position not dependent on a position of the hand of the user; and
based on an output of a gesture recognition machine configured to analyze the received hand tracking data:
determining a location of a thumbtip of the hand of the user along a continuum of positions along the length of the first finger, the continuum of positions along the length of the first finger divided into to a plurality of discrete positions for microgesture target assignment;
responsive to determining that the thumbtip is within a threshold distance of the first finger at a first position along the length of the first finger, augmenting an indicator for a corresponding first microgesture target; and
further augmenting the indicator of the first microgesture target based on a duration the thumbtip is at the first position; and
responsive to detecting a confirmation action, executing the corresponding microgesture target.

* * * * *